(12) United States Patent
Beier et al.

(10) Patent No.: US 6,316,086 B1
(45) Date of Patent: Nov. 13, 2001

(54) FRICTION LINING FOR TORQUE TRANSMISSION DEVICES

(75) Inventors: Wolfram Beier, Essenheim; Rainer Liebald, Nauheim; F. Nagler, Gädheim, all of (DE)

(73) Assignees: Schott Glas, Mainz (DE); Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/295,330

(22) Filed: Apr. 21, 1999

(30) Foreign Application Priority Data

Apr. 21, 1998 (DE) .............................................. 198 17 611

(51) Int. Cl.⁷ ..................................................... B32B 17/12
(52) U.S. Cl. .................. 428/293.4; 428/113; 428/292.1; 428/293.1; 428/367
(58) Field of Search ..................................... 428/288, 113, 428/224, 238, 367, 408, 284, 293.1, 293.4, 292.1

(56) References Cited

U.S. PATENT DOCUMENTS

| 4,341,840 | * | 7/1982 | Prewo . |
| 4,610,917 | * | 9/1986 | Yamamura et al. . |
| 4,626,515 | | 12/1986 | Chyung et al. .......................... 501/32 |
| 5,079,196 | * | 1/1992 | Arfsten et al. . |

FOREIGN PATENT DOCUMENTS 0 469 464    2/1992   (EP) .

* cited by examiner

*Primary Examiner*—Merrick Dixon
(74) *Attorney, Agent, or Firm*—Millen, White, Zelano & Branigan, P.C.

(57) ABSTRACT

Friction linings for torque transmission devices, in particular for friction clutches, are based on an inorganic composite material of (a) a matrix of glass or glass ceramic, (b) inorganic reinforcing fibres and (c) one or more ceramic, vitreous or metallic fillers, the fillers providing the friction clutches with improved comfort characteristics.

20 Claims, 1 Drawing Sheet

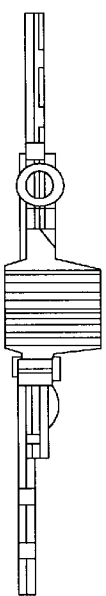 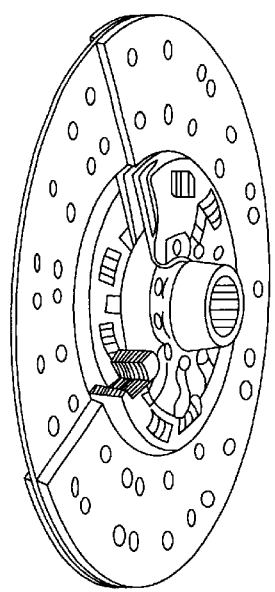
FIG. 1   FIG. 2
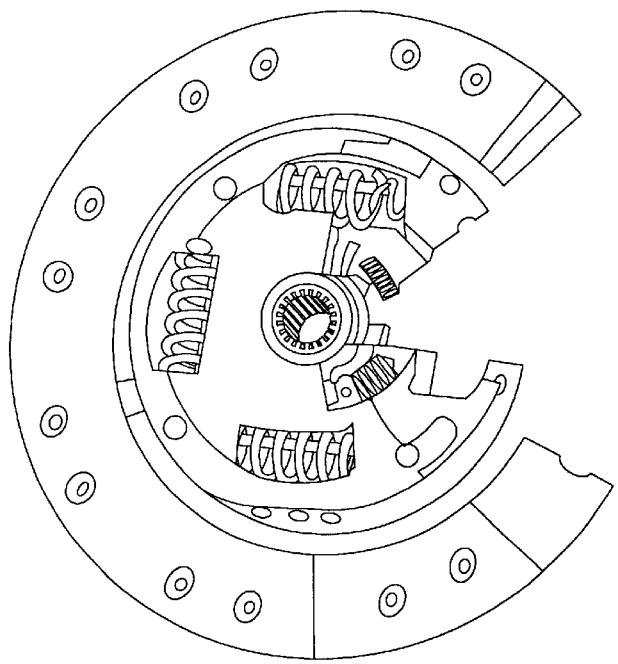
FIG. 3

FRICTION LINING FOR TORQUE TRANSMISSION DEVICES

FIELD OF THE INVENTION

The invention relates to a friction lining for torque transmission devices, in particular for friction clutches, comprising an inorganic composite material.

Torque transmission devices, e.g. friction clutches, should have a torque transmission capability which is as high as possible.

BACKGROUND OF THE INVENTION

Important criteria for judging friction linings for clutches, in particular for motor vehicle clutches, are the coefficient of friction $\mu$, the wear, the mechanical strength and fracture toughness, and the rotational speed at which rupture occurs, the tendency to self-induced frictional vibrations ("bucking" or "grabbing") and frictional noise, the heat resistance.

In detail, this means:

The coefficient of friction $\mu$ should be as high as possible and have very little dependence on the operating and ambient conditions. Since the forces which can be transmitted are proportional to the product of coefficient of friction and contact pressure ($\mu \times F_c$), a clutch can, for a given contact force, be made smaller, the higher the coefficient of friction $\mu$. The coefficient of friction of the friction lining is dependent on the countermaterial. Customary counter-materials in motor vehicle clutches are grey cast iron or steel. The friction linings used at present for passenger car clutches have, in practical operation, $\mu$ values of about 0.2–0.4 against grey cast iron. In the design of the clutch, a design value of 0.25 is assumed, which is compensated by safety factors. The coefficient of friction should be as constant as possible with regard to changes in temperature, humidity, contact pressure and angular velocity.

The wear of the friction lining should be low. A guideline for the life of the linings when the clutch is operated correctly is the working life of the motor vehicle. Of course, the countermaterial to the friction lining should not be worn too much by the lining. A measure of the wear is the wear rate.

A high mechanical strength and fracture toughness are required, in particular, when installing the linings by means of riveting. The rotational speed at which rupture occurs should be 1.7–2 times the maximum rotational speed of the engine, i.e. usually 15,000/min, since such high rotational speeds of the clutch disc can occur when mistakes are made in changing down, for example when changing from 5th to 1st gear in a passenger car.

Bucking is among the most serious clutch-related quality problems. Bucking is said to occur when the first resonant frequency of the drive train is excited so strongly that longitudinal vibrations of the vehicle can be felt. Bucking is not easily quantifiable, but is of great importance to the subjective impression of the driver. The intensity of bucking is dependent not only on the lining, but also depends on the structural design of the overall clutch system and its spring elements, although lining-related bucking makes up a significant proportion. Clutches which have no bucking tendency, or have only a limited bucking tendency, are said to have good comfort performance.

In practical use, friction linings of clutches have to withstand considerable thermal stresses without damage, i.e. including no distortion. The aim is to push the temperature limit at which fading occurs further upwards.

A further aspect, namely the environmental friendliness of the materials used, can be regarded as having already been solved, at least insofar as the use of asbestos which was formally customary for clutch linings is no longer necessary.

The presently commercially available friction linings for motor vehicle clutches are organic composite materials. They comprise yarns which are embedded in an frictional cement made of resins, rubbers and fillers such as carbon black, graphite and kaolin. The yarns preferably consist of polyacrylonitrile, aramid, cellulose, glass and other fibres and brass or copper wire. Such friction linings display a good comfort performance but, owing to their organic constituents, in particular the organic matrix, have an unsatisfactory heat resistance, so that when certain temperature limits are exceeded during operation of the clutch the $\mu$ value drops, leading to a considerable reduction in comfort due to "lining grab" and finally to fading (slipping of the clutch). Further thermal stresses lead to destruction of the friction lining and to complete failure of clutch function.

For some commercial vehicles, e.g. refuse lorries, sintered metal linings based on copper are used. Sintered linings have a high coefficient of friction (about 0.3–0.6) and low wear, but they cause considerable wear of the countersurfaces. In terms of meterability, bucking and frictional noise, metal linings are inferior to the organic linings.

EP 0 469 464 B1 discloses a composite material for friction linings in which the binder matrix is produced from a mixture of $SiO_2$ and at least some water-soluble silicates, e.g. alkali metal silicates (water glass) which is cured in the presence of water. Such a material will have unsatisfactory hydrolytic stability which is disadvantageous, e.g. if condensed water is formed when the temperature drops below the dew point.

U.S. Pat. No. 4,341,840 discloses glasses reinforced with graphite fibres for bearings, seals and brakes. These composite materials will not be sufficiently heat resistant and will have an unsatisfactory comfort performance.

It is an object of the invention to find a friction lining for friction clutches, in particular motor vehicle clutches, which has an improved property profile, in particular increased heat resistance and thus the ability to transmit a higher torque at a given lining area.

Upon further study of the specification to appended claims, other objects and advantages of the invention will become apparent.

SUMMARY OF THE INVENTION

According to one aspect of the invention, these objects are achieved by providing a friction lining for torque transmission device, in particular for friction clutches, comprising an inorganic composite material, where the composite material comprises a glass or glass ceramic matrix, inorganic reinforcing fibres and one or more ceramic, vitreous or metallic fillers.

It has surprisingly been found that a purely inorganic composite material comprising a glass or glass ceramic matrix, inorganic reinforcing fibres and one or more ceramic, vitreous or metallic fillers can replace conventional friction linings for clutches and is even superior to them with respect to some properties.

The production of fibre-reinforced glass or fiber-reinforced glass ceramic is well known and described in numerous publications, of which U.S. Pat. No. 4,610,917, U.S. Pat. No. 4,626,515 and U.S. Pat. No. 5,079,196 may be mentioned here purely by way of example.

The addition of fillers and functional additives, hereinafter simply referred to as fillers, to composite materials is known, for example, from EP 0 469 464 B1. These fillers serve as lubricants, friction modifiers or purely as fillers and are incorporated in the production process, e.g. added to the slurry.

In principle, any glass can be reinforced with ceramic fibres. To avoid or reduce internal stresses, it is useful to strive for some degree of matching of the coefficients of thermal expansion. Since silicon carbide fibres and carbon fibres, which are frequently used as reinforcing fibres, have small thermal expansions, the matrix is preferably a glass which has a coefficient of thermal expansion $\alpha_{20/300}$ of less than $10 \times 10^{-6}$/K.

The maximum permissible temperature for such a reinforced composite material depends on its specific constituents and on its microstructure. The glass transition temperature $T_g$ of the glass used as matrix serves as a guide to the maximum long-term use temperature. However, the heat resistance can be increased by the fibre reinforcement so that fibre-reinforced glasses can successfully withstand temperatures above the $T_g$ of the glass matrix.

Matrix glasses which have been found to be particularly useful are $B_2O_3$-containing glasses. Borosilicate glasses, whose best known representatives are commercially available under the names Duran® and Pyrex®, have a low coefficient of thermal expansion $\alpha_{20/300}$ in the range from about 3 to $5 \times 10^{-6}$/K and a $T_g$ in the range from about 500° C. to 600° C.

These glasses generally have an approximate composition (in % by weight on a oxide basis) of 70–80 $SiO_2$, 7–13 $B_2O_3$, 4–8 alkali metal oxides and 2–7 $Al_2O_3$.

Aluminosilicate glasses, in particular glasses having an approximate composition (in % by weight on an oxide basis) of 50–55 $SiO_2$, 8–12 $B_2O_3$, 10–20 alkaline earth metal oxides and 20–25 $Al_2O_3$, are also well suited as matrix glasses since they are resistant to high temperatures. They have a $T_g$ in the range from about 650° C. to 750° C.

Furthermore, alkali metal-alkaline earth metal silicate glasses (e.g. approximate composition in % by weight: 74 $SiO_2$, 16 $Na_2O$, 10 $CaO$) having a $T_g$ of about 540° C. and an $\alpha_{20/300}$ of about $9 \times 10^{-6}$ /K can also be successfully used as glass matrix for the composite material of the invention. Basalt glass is likewise suitable as glass matrix. In addition, glasses as are used for TV tubes, namely for the funnel and screen components of the tube, are also suitable as glass matrix. Screen glasses are generally alkali metal-alkaline earth metal silicate glasses having a high proportion of SrO and/or BaO. Funnel glasses are usually glasses of the same type which additionally contain small amounts of PbO. In contrast, glasses used for the neck of TV tubes, known as neck glasses, have high PbO contents and are thus less suitable for the purposes of the present invention because the materials should be environmentally friendly.

Glass ceramics as matrix have an even higher heat resistance. Glass ceramics and their production by controlled crystallization have been known for decades.

Composition systems which are suitable for the glass ceramic matrix are, for example, $Li_2O$-$Al_2O_3$-$SiO_2$, $MgO$-$Al_2O_3$-$SiO_2$, $CaO$-$Al_2O_3$-$SiO_2$ or $MgO$-$CaO$-$BaO$-$Al_2O_3$-$SiO_2$ which can be modified by means of a variety of additives in a known manner.

The glass ceramic matrix can also comprise an $Li_2O$-$Al_2O_3$-$SiO2$ -crystal-containing borate glass or other crystallizable glass compositions. Such composites have the advantage that they can be processed at relatively low temperatures but withstand higher temperatures after crystallization.

The minimum concentration of the glass matrix or glass ceramic matrix in the composition is at least 5% by weight, but not more than 60% by weight, with the preferred content being 20–25% by weight, and the most preferred 25–50% by weight.

Reinforcing fibres for glass and glass ceramics are likewise well known and all inorganic reinforcing fibres are suitable for the present purpose. Use is mainly made of fibres of carbon, SiC, BN, $Si_3N_4$, $Al_2O_3$, $ZrO_2$, mullite, here particularly the Si-richer 3 $Al_2O_3 \times 2$ $SiO_2$, calcium silicates (x $CaO \cdot y$ $SiO_2$), fused silica, glasses having a high $SiO_2$ content, i.e. glasses having a $SiO_2$ content of more than 80% by weight, A-, C-, S- or E-glass and/or rock wools, for example basalt wool, as main components, with or without additions of Si, Ti, Zr, Al, O, C, N, e.g. fibres of the sialon type (Si, Al, O, N).

E-glass is a calcium aluminoborosilicate glass which is largely free of alkali metals. S-glass is a magnesium aluminosilicate glass, C-glass is a sodium calcium borosilicate glass and A-glass is a sodium calcium silicate glass.

Particularly suitable fibres are carbon fibres and silicon carbide fibres. A high proportion of SiC fibres reduces wear. A high proportion of C fibres makes the composite material cheaper.

Particular advantages are provided by composite materials which contain both SiC and C fibres, since wear is reduced and the frictional performance can be adjusted by means of the inexpensive C fibres.

Particular preference is given to an SiC/C ratio of about 1:4. Lowering the proportion of SiC to 1/5 enables the production costs for the composite material to be reduced greatly without a deterioration in properties having to be accepted.

To improve the frictional and comfort properties, the reinforcing fibres can also be provided with a, usually thin, coating, for example of carbon, carbides, $SiO_2$, $Al_2O_3$ or other oxides.

The techniques for obtaining such coatings are known in the art, for example, the paper entitled "Formation of Carbon Coatings on SiC Fibers by Selective Etching in Halogens and Super Critical Water" Gogotsi et al., Ceramic Engineering and Science Proceedings, Vol. 19, Issue 3, 1998, 22nd Annual Conference on Composites, Advanced Ceramics, Materials, and Structures: A, published by the American Ceramics Society, 735 Ceramics Place, Westerville, Ohio 43801, and the text Carbon Fibers, 2nd edition, revised and expanded, Donnet and Bansal, pages 196–199, Marcel Dekker, Inc., New York, 1990.

The fibre content of the composite material is from about 5 to 55% by weight. A higher fibre content is achieved only at considerable cost, while at a proportion of fibres of less than 5% by weight, the property changes produced by fibre reinforcement, in particular the increase in strength, become very small and a uniform distribution of the fibres in the matrix is made more difficult.

For economic and technical reasons, a fibre content of from about 25 to 45% by weight is preferred.

When a plurality of different fibre types are used, hybrid composites are obtained.

Apart from the glass/glass ceramic matrix and the inorganic reinforcing fibres, the friction lining of the invention contains one or more inorganic fillers which are added in powder form. These can be ceramic, vitreous or metallic fillers. The most important fillers are mentioned by way of example below.

Use is made of $SiO_2$, either as crystalline quartz, fused quartz or vitreous fused silica, $Al_2O_3$, $ZrO_2$ or similar oxides, also $Fe_2O_3$ and $Cr_2O_3$, calcium silicates such as wollastonite ($CaO \times SiO_2$), $2\ CaO \times SiO_2$, $3\ CaO \times SiO_2$, magnesium silicates and their hydrates, e.g. talc ($3\ MgO \times 4\ SiO_2 \times H_2O$), zirconium silicate, mica, dolomite, aluminosilicates such as mullite, sillimanite, kaolin or clay, further calcium aluminosilicates, potassium aluminosilicates and magnesium aluminosilicates, e.g. cordierite, also cement, magnesium oxide, magnesium carbonate and its hydrates, magnesium aluminate, chromite, titanium oxide, e.g. rutile, aluminium titanate, further carbonates, e.g. limestone, also quicklime (CaO), sulphates, e.g. $BaSO_4$, $CaSO_4$, especially as hemihydrate or anhydrite, sulphides such as $MOS_2$, or CuS, nitrides, e.g. BN, carbides, e.g. SiC, $B_4C$, TiC, carbon, either as graphite, carbon black or powdered coke, and also metals, e.g. copper, aluminium, magnesium, iron or steel, or semimetals such as silicon and/or their alloys.

When the filler is a vitreous material, it can be distinguished from the glass matrix, even if the same chemical composition is used for the matrix and the filler. Thus, not only can an electron microscope or a micro-sized electron-beam probe be used, but it is also possible to distinguish the matrix from the filler by light optical methods, as known in the art, inasmuch as the matrix is fully fused, but the filler is not.

Fillers used are preferably $SiO_2$, $Al_2O_3$, $ZrO_2$, magnesium silicates and their hydrates, calcium silicates, mullite, kaolin, SiC, TiC, $BaSO_4$, BN, carbon, carbon black or powdered coke. Here, the hard materials increase the wear resistance while the components having a lower hardness improve the comfort performance.

Particular preference is given to filler mixtures of $SiO_2$ and kaolin, of kaolin and talc, of kaolin and carbon, carbon black or powdered coke or of $ZrO_2$ and carbon, carbon black or powdered coke.

It is particularly advantageous to use one or more fillers selected from the group consisting of SiC, $ZrO_2$, $Al_2O_3$, carbon powder and carbon black.

In a very particularly advantageous embodiment, the filler used is C powder or carbon black together with a component selected from the group consisting of SiC, $ZrO_2$ and $Al_2O_3$.

The filler content of the composite material is at least about 5% by weight and at most about 50% by weight.

At lower proportions, they have too little effect, while higher proportions result in processing difficulties.

Particular preference is given to a filler content of from about 25 to 40% by weight.

In general, the composite materials can be matched to their use by appropriate selection of matrix, fibres and fillers. Many physical properties such as thermal expansion, thermal conductivity, creep behaviour at elevated temperatures, tribological behaviour, etc., can be varied and set within certain limits.

The fibres incorporated in the composite material can be varied in many ways, not only in respect of the chemical composition but also in respect of the microstructure and the external geometry.

The microstructure of the fibres determines (for a given chemical composition) the physical properties. Thus, for example, carbon fibres can be particular high-modulus and high-strength fibres whose different degree of graphitization influences the tribological and thermal behaviour. Thus, when using the same reinforcing fibres, it is to a certain extent possible to vary the grade of fibres employed so as to optimize the composite material in respect of the desired properties.

A particularly wide range of variation possibilities is offered by the geometry (shape and dimensions) of the reinforcing fibres and the arrangement of the fibres in the composite.

Thus, the glasses and glass ceramics can be reinforced with whiskers, short fibres, long fibres or continuous fibres; further possibilities are the use of fibre mats and woven fabrics and the use of fibre filters. In addition, the orientation of the fibres in the material can be matched to the geometry of the component produced from the material by, for example, producing circular or other ring structures or ring-shaped components by means of winding.

Whiskers and short fibres (up to a fibre length of about 5 mm) are usually distributed isotropically in the composite, which leads to isotropic properties, but they can also be partially oriented, e.g. by extrusion at elevated temperature. Very high fracture toughnesses cannot be achieved using whiskers or short fibres. In contrast, long and continuous fibres are, at least in large parts of the composite, aligned in parallel, which leads to a considerable improvement in the mechanical properties of the composite in this direction, but effects very little improvement perpendicular thereto. However, a large measure of isotropy, at least in one plane, can also be achieved when using long and continuous fibres by means of a laminate structure in which the fibres are arranged at angles to one another.

In general, producing and shaping composites containing long or continuous fibres is more difficult than in the case of whiskers and short fibres, but it makes it possible to achieve particularly good mechanical properties in preferred directions. The correct selection of the fibre architecture makes it possible to develop components which are matched to the stresses to be expected. The fibre architecture required for fibre-reinforced components is known to those skilled in the art, e.g. from fibre-reinforced plastic components.

The use of fibre felt and woven fabrics leads to composite materials which only have moderate strength values compared with composites containing long or continuous fibres, but the composites can be produced using inexpensive techniques. Thus, fabrics and felt can, for example, be infiltrated with glass melts or with sol-gel solutions which can be converted into glass or glass ceramic by subsequent heat treatment.

The way in which the material is produced, i.e. whether using whiskers, continuous fibres, long fibres, short fibres, fabrics, felt, etc., depends on the specific physical and technical requirements in each case and, of course, on the production costs which determine the price of the material and thus its economic utility.

Owing to the particular requirements in respect of the technical specifications and economic production, preference is given to using randomly oriented short fibres in the friction lining of the invention, although good results can also be achieved using oriented fibre architectures.

The mechanical properties such as the strength and modulus of elasticity of fibre-reinforced glasses or glass ceramics are essentially determined by the amount and arrangement of the fibres introduced. The thermomechanical properties, e.g. the thermal expansion, and the thermal properties, e.g. the thermal conductivity, are, like the tribological properties such as coefficient of friction and wear, influenced by the composition of the overall composite, i.e. by the proportions of individual components and their properties.

Thus, unidirectionally oriented C or SiC fibres at a fibre content of about 40% by weight give flexural strengths of more than 1200 MPa and E moduli of more than 130 GPa with a simultaneous increase in the work of fracture compared with the pure glasses or glass ceramics. A multidirectionally oriented or random fibre arrangement or a different fibre content gives, depending on the proportion of fibres present in the stress direction in the composite, lower strengths and E moduli.

Glasses reinforced purely with SiC fibres have a very low anistropic thermal conductivity of about 1.5 $W \times m^{-1} \times K^{-1}$ which can be altered by introduction of additives, depending on their proportion. Thus, the addition of carbon fibres and/or carbon powder, metal powder and/or ceramic powder increases the thermal conductivity and also the thermal expansion. The addition of components having a low thermal conductivity and a low thermal expansion, e.g. fused silica, can correspondingly reduce these property values.

The composite materials are amenable to mechanical handling or treatments so that they can, as linings, readily be mounted on the clutch disc, generally by riveting, screwing or adhesive bonding.

The above-described purely inorganic composite materials having a water-insoluble matrix withstand the specific combined thermal, tribological and mechanical stresses to which the friction linings of clutches are subjected very well. Thus, they also meet the requirements in respect of the rotational speed at which rupture occurs.

Surprisingly, they are not only very heat resistant but also meet the entire property profile. Thus, apart from the required strength, they also have a constant, high coefficient of friction and low wear and display good comfort performance. The latter property in particular could not have been foreseen.

Specifically, compared with the conventional organic clutch linings, these composite materials have a significantly higher long-term heat resistance, a wear rate against grey cast iron of less than $5 \times 10^{-5}$ mm$^3$/Nm, a coefficient of friction $\mu$ against grey cast iron of from 0.3 to 0.8 and a high constancy of the coefficient of friction at sliding velocities of 4–40 m/s. Here, coefficient of friction and wear rate were determined in a block-and-ring arrangement with the ring as metallic countermaterial at pressures up to 5 MPa and relative velocities up to 5 m/s. A measurement carried out in a pin-and-disc arrangement with the disc as metallic countermaterial leads to the same values.

The composite materials are thus very suitable as friction linings for friction clutches. In this application, they are superior to the materials used hitherto. Their good long-term heat resistance is much better than that of the organic linings which are customarily used. Compared with sintered metallic linings, they have, in particular, better comfort performance and lower wear of the countermaterial. The purely inorganic composite materials described thus combine the properties which are wanted and have hitherto only been partly realized and are therefore very suitable for a wide variety of friction clutches. A typical friction lining has a thickness between 1 mm and 30 mm. The lining can cover the whole clutch ring or it can consist of several (4–8) segments, called pads, with an annular arrangement. Such a pad might have a dimension of about 2 cm ×5 cm (10 cm$^2$) to 10 cm ×20 cm (200 cm$^2$). They need not cover the whole surface of the clutch since there can be gaps between them. Usually a clutch disk is a ring made from steel and the linings are preferably affixed by riveting or by riveting and adhesive bonding.

The customary motor vehicle clutch is the engaging and disengaging, dry friction clutch by means of which the engine can be disconnected from the remaining drive train and can be smoothly reconnected with transmission of torque. Dry friction clutches are used, in particular, in passenger cars and commercial vehicles. The friction linings of the invention are very suitable for these clutches.

A motor vehicle clutch of the standard construction type comprises a diaphragm spring pressure plate screwed to the flywheel, a clutch disc which is axially moveable on the shaft into the gearbox and has two friction linings, a torsion damper integrated into the clutch disc and a release device which, via a ball-bearing, transmits the release displacement from the non-rotating actuating elements to the pressure plate. The flywheel serves as the surface with which the clutch disc is in frictional contact.

The composite materials described are suitable as friction linings both for these standard clutches and for further developments such as clutches having a two-mass flywheel, bridging clutches in torque converters or disengaging clutches in automatic transmissions.

Another type of clutch is the wet-running clutch (wet clutch). It is used, in particular, in certain passenger vehicles and commercial vehicles such as motor cycles and agricultural tractors. The composite materials described are also well suited as friction linings for these wet clutches.

The composite materials described are also well suited as friction linings for the clutches of a wide variety of special vehicles, for example vehicles in opencast and underground mining and in military applications, e.g. self-propelled gun carriages, and also of agricultural vehicles.

Friction linings are also required for automatic clutch actuation. Here too, the composite materials described are well suited.

The composite materials are suitable not only as friction linings for motor vehicle clutches as starting and/or gearchange clutches, but also as friction linings for other drive clutches, for example for turbines and manufacturing machinery, e.g. printing and textile machinery, and for transport, conveying and lifting appliances.

As is generally known, friction linings for friction clutches are, with appropriate modification, also suitable for brakes. The overall mechanisms for friction clutches and brakes are described in the patent and general literature, for example, in Mark's Mechanical Engineers' Handbook, 6th edition.

BRIEF DESCRIPTION OF ATTACHED DRAWING

The attached drawing shows several views of a clutch disc having a friction lining and a torsion damper, which discs are conventional in the art except for the use of the friction lining of the present invention, and wherein FIG. 1 is an end view, hereto is an isometric view and FIG. 3 is a fractional plan view.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

Fibre-reinforced composite materials with fibres in an unordered arrangement were produced from various material combinations in a customary manner, namely by the slurry-sol-gel method. Various mechanical and tribological properties of these materials were determined in test bench and motor vehicle experiments.

Depending on the composition, strengths of from 150 and 250 MPa and E moduli up to 100 GPa were found.

The following percentages in the compositions are by weight.

Firstly, filler-free composite materials composed of 50% of borosilicate glass matrix (Duran®) and 50% of SiC and/or C fibres, viz. short fibres having lengths of from 1 to 50 mm, in various proportions were produced: C1–C5. The proportions of each of the fibres and the measurement results (coefficient of friction and wear rate) are shown in Table 1.

Starting from C1 (only SiC fibres) having a coefficient of friction of 0.4, a wear rate of $2 \times 10^{-6}$ mm$^3$/Nm and an unsatisfactory comfort performance, an increasing C fibre content increases the coefficient of friction to up to 0.8 (C5, only C fibres) but also increases the wear rate to up to $3 \times 10^{-5}$ mm/Nm (C5). The comfort performance is improved only a little.

TABLE 1

Coefficients of friction and wear rates of composite materials composed of 50% of borosilicate glass matrix and 50% of fibres.

|  | C1 | C2 | C3 | C4 | C5 |
|---|---|---|---|---|---|
| Fibres: | | | | | |
| SiC | 50% | 40% | 25% | 10% | — |
| C | — | 10% | 25% | 40% | 50% |
| Coefficient of friction $\mu$ | 0.40 | 0.45 | 0.58 | 0.65 | 0.80 |
| Wear rate [mm$^3$/Nm] | $2 \times 10^{-6}$ | $4 \times 10^{-6}$ | $7 \times 10^{-6}$ | $10 \times 10^{-6}$ | $30 \times 10^{-6}$ |

Composite materials composed of 40% of borosilicate glass matrix (Duran®), 30% of SiC (6%) and C fibres (24%) and 30% of different fillers and filler mixtures were also produced.

Compared with the filler-free comparative examples which gave good results in respect of coefficient of friction and wear rate but had a less good comfort performance, the coefficient of friction remains high (about 0.4–0.6), the wear is maintained or even reduced and the comfort performance is improved.

In detail:

If the filler comprises SiC, ZrO$_2$ or Al$_2$O$_3$ powder or a mixture thereof, the coefficient of friction is high (up to about 0.7) and, in particular, the wear is reduced, e.g. at a ZrO$_2$ content of 30% to $1 \times 10^{-6}$ mm$^3$/Nm. The comfort performance is also improved a little. For two examples (E1, E2), the specific data for the coefficient of friction and the wear rate are shown in Table 2.

In the case of C powder and/or carbon black as filler, the coefficient of friction is also improved or remains high. The comfort performance is also improved. Although the wear rate increases a little, it is still within a tolerable range. The examples E3 and E4 in Table 2 illustrate these statements. Kaolin also belongs to this group of fillers.

If the filler is a mixture of a C powder, carbon black or kaolin together with SiC, ZrO$_2$ or Al$_2$O$_3$ powder with a total filler content of again 30%, the comfort performance improves. Coefficient of friction and wear rate remain satisfactorily good or are even improved (see Table 2, E5–E8).

The friction lining made up of matrix, fibres and fillers thus has, compared with the filler-free examples, an improved comfort performance and combines a good, i.e. high, coefficient of friction with a good, i.e. low, wear rate.

TABLE 2

Coefficients of friction and wear rates of composite materials composed of 40% of borosilicate glass matrix, 30% of fibres (6% SiC, 24% C) and 30% of fillers.

| | Filler | Coefficient of friction $\mu$ | Wear rate [mm$^3$/Nm] |
|---|---|---|---|
| E1 | 30% ZrO$_2$ | 0.43 | $1 \times 10^{-6}$ |
| E2 | 30% Al$_2$O$_3$ | 0.42 | $5 \times 10^{-6}$ |
| E3 | 30% C | 0.58 | $11 \times 10^{-6}$ |
| E4 | 30% carbon black | 0.46 | $14 \times 10^{-6}$ |
| E5 | 27% ZrO$_2$ 3% carbon black | 0.45 | $2 \times 10^{-6}$ |
| E6 | 15% ZrO$_2$ 15% kaolin | 0.60 | $30 \times 10^{-6}$ |
| E7 | 15% Al$_2$O$_3$ 15% C | 0.63 | $27 \times 10^{-6}$ |
| E8 | 15% SiC 15% C | 0.43 | $5 \times 10^{-6}$ |

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding German application 19817611.2, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A friction lining for friction clutches, consisting essentially of an inorganic composite material comprising 5–60% by weight of the composite of a matrix of a glass or glass ceramic, 5–55% by weight of the composite of inorganic reinforcing fibers and 5–50% by weight of the composite of one or more ceramic, vitreous or metallic fillers.

2. A friction lining according to claim 1, characterized in that the glass matrix comprises borosilicate glass, aluminosilicate glass, alkali metal-alkaline earth metal silicate glass or basalt glass.

3. A friction lining according to claim 1, characterized in that the glass ceramic matrix comprises a glass ceramic of the system Li$_2$O-Al$_2$O$_3$-SiO$_2$, MgO-Al$_2$O$_3$-SiO$_2$, CaO-Al$_2$O$_3$-SiO$_2$ or MgO-CaO-BaO-Al$_2$O$_3$-SiO$_2$ or comprises Li$_2$O-Al$_2$O$_3$-SiO$_2$-crystal-containing borate glasses.

4. A friction lining according to claim 1, characterized in that the reinforcing fibres comprise one or more components selected from the group consisting of carbon, SiC, BN, Si$_3$N$_4$, Al$_2$O$_3$, ZrO$_2$, mullite, calcium silicates, fused silica, glass having an SiO$_2$ content of more than 80% by weight, A-, C-, S- or E-glass and rock wool as main components, with or without additions of Si, Ti, Zr, Al, C, N or O.

5. A friction lining according to claim 4, characterized in that the reinforcing fibres comprise carbon and/or SiC.

6. A friction lining according to claim 4, characterized in that the reinforcing fibres are provided with a coating of carbon, carbides, SiO$_2$ or Al$_2$O$_3$.

7. A friction lining according to claim 6, characterized in that the fibre content is from 25 to 45% by weight.

8. A friction lining according to claim 2, characterized in that the filler or fillers comprise pulverulent $SiO_2$ (as crystalline quartz, fused quartz or fused vitreous silica), $Al_2O_3$, $ZrO_2$, $Fe_2O_3$, $Cr_2O_3$, calcium silicates, magnesium silicates and their hydrates, zirconium silicate, aluminosilicates, calcium aluminosilicates, potassium aluminosilicates, magnesium aluminosilicates, mica, cement, magnesium oxide, magnesium carbonate and its hydrates, magnesium aluminate, chromite, dolomite, titanium oxide, aluminium titanate, carbonates, sulphates, carbides, sulphides, nitrides, carbon (as graphite), carbon black or powdered coke, iron, steel, copper, aluminium, silicon, magnesium and/or their alloys.

9. A friction lining according to claim 8, characterized in that the filler or fillers comprise pulverulent $SiO_2$, $Al_2O_3$, $ZrO_2$, magnesium silicates and their hydrates, calcium silicates, mullite, kaolin, SiC, TiC, $BaSO_4$, BN, carbon, carbon black or powdered coke.

10. A friction lining according to claim 9, characterized in that the fillers comprise a mixture of $SiO_2$ and kaolin or of kaolin and talc, or of kaolin and carbon, carbon black or powdered coke, or of $ZrO_2$ and carbon, carbon black or powdered coke.

11. A friction lining according to claim 9, characterized in that the filler or fillers comprise SiC and/or $ZrO_2$ and/or $Al_2O_3$ and/or carbon powder and/or carbon black.

12. A friction lining according to claim 11, characterized in that the fillers comprise a mixture of carbon powder or carbon black and a component selected from the group consisting of SiC, $ZrO_2$, $Al_2O_3$.

13. A friction lining according to claim 1, characterized in that the filler content is from 25 to 40% by weight.

14. A friction lining according to claim 1, characterized in that the composite material against grey cast iron in a block-and-ring or pin-and-disc arrangement with ring or disc as metallic countermaterial has, at pressures of up to 5 MPa and relative velocities of up to 5 m/s, a coefficient of friction p of at least 0.3, a constant coefficient of friction at sliding velocities of 4–40 m/s and a wear rate of less than $5 \times 10^{-5}$ $mm^3Nm$.

15. A friction lining according to claim 14, comprising a fiber content of 25–45% by weight, a filler content from 25–40% by weight, and a glass or glass-ceramic matrix of 20–55% by weight.

16. A friction lining according to claim 14, comprising a fiber content of 5–55% by weight, a filler content from 5–50% by weight, and a glass or glass-ceramic matrix of 5–60% by weight.

17. A friction lining according to claim 1, comprising a fiber content of 25–45% by weight, a filler content of 25–40% by weight, and a glass or glass-ceramic matrix of 20–55% by weight.

18. A clutch ring comprising a metallic surface having attached thereto a friction lining according to claim 1.

19. A friction lining according to claim 1 wherein said inorganic reinforcing fibers are other than graphite fibers.

20. A clutch ring comprising a metallic surface having attached thereto a friction lining according to claim 19.

* * * * *